H. GALT.
POT FOR COFFEE, &c.
APPLICATION FILED APR. 3, 1913.
1,097,710.
Patented May 26, 1914.
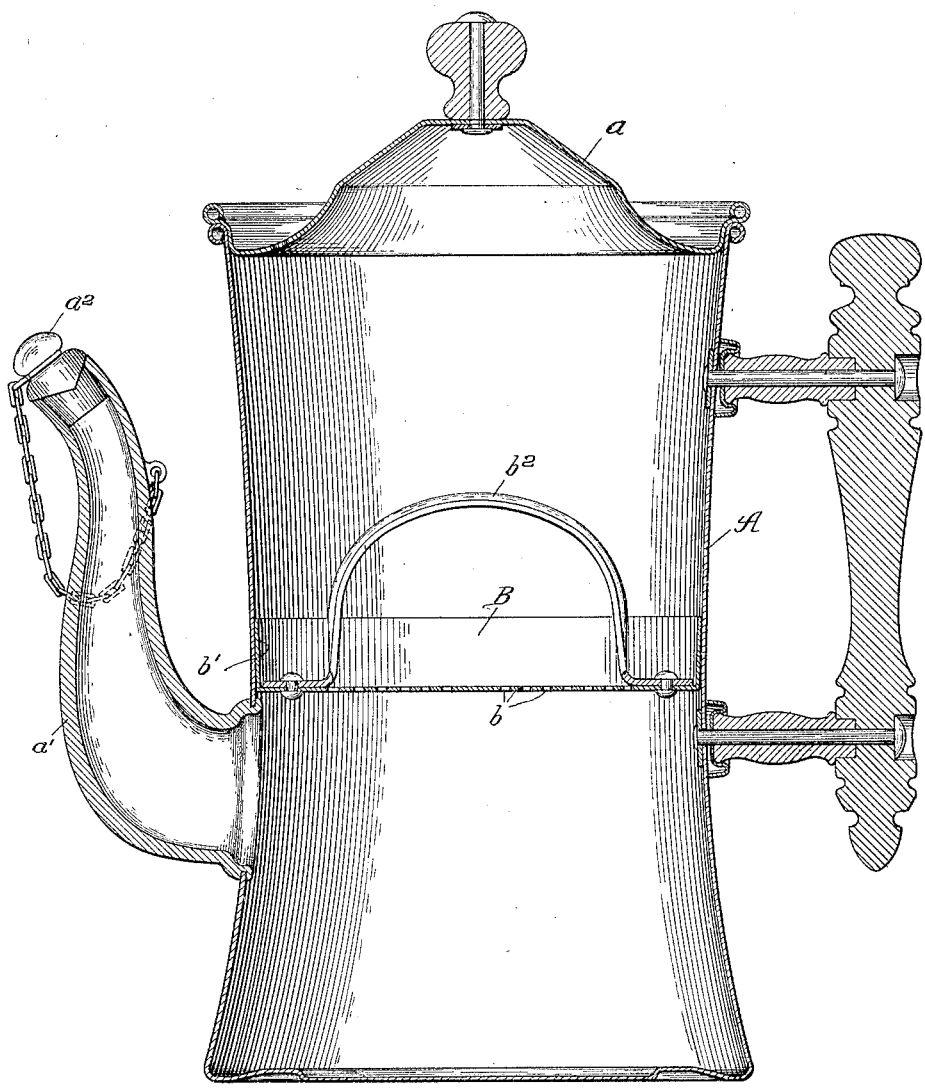

UNITED STATES PATENT OFFICE.

HUBERT GALT, OF CHICAGO, ILLINOIS.

POT FOR COFFEE, &c.

1,097,710. Specification of Letters Patent. Patented May 26, 1914.

Application filed April 3, 1913. Serial No. 758,565.

*To all whom it may concern:*

Be it known that I, HUBERT GALT, a citizen of the Dominion of Canada, residing at Chicago, in the county of Cook and State of Illinois, have invented certain new and useful Improvements in Pots for Coffee, &c., of which the following is a specification, reference being had therein to the accompanying drawing.

My invention relates to pots primarily intended for making coffee and tea and its object is to provide a simple device by which coffee or tea can be made off the stove or other heater in a single container or vessel having a temporarily sealed spout and an inner removable screen making an air tight joint with the pot and upon which the tea leaves or ground coffee are supported at approximately the middle of the pot to receive and hold the boiling water in the upper portion of the pot to steep the material and which can be readily removed from the pot after the boiling water has acted on the material to carry the spent grounds or leaves out of the pot so that the latter may then be filled up with water to produce coffee or tea equal in amount to the capacity of the pot.

The invention consists in the matters hereinafter described and then pointed out in the claim.

In the accompanying drawing the figure is a central vertical sectional view of a pot embodying my invention, and the reference letter A indicates a coffee or tea pot provided with a removable cover $a$ and having its interior cross-sectional area or diameter reduced at approximately its middle portion and above the spout $a'$, this conformation being obtained preferably by inwardly inclining the inner wall from the top toward the center of the pot as shown in the drawing.

The reference letter B indicates a screen having a perforated or reticulated bottom $b$ and an upwardly directed slightly flared body $b'$ having an outer cross-sectional area or diameter substantially equal to the inner diameter of the pot at approximately its central point, the configuration and size of these parts being such that the body of the screen fits with and makes a substantially air tight joint with the inner wall or face of the pot when the screen is placed in position in the pot above the discharge spout $a'$. This result may best be obtained by having the inner wall of the pot and the body portion of the screen slightly flared or expanded toward the top, and the best results are obtained by making the body of the pot seamless, as for example by drawing or spinning it from metal, so that its inner wall is flush and there will be no seam or joint to interrupt its uniform curvature and the screen may be placed in position to complete the air tight joint by merely crowding or pushing it down into place without positioning it to bring any particular portion into register with the seam or joint. The body of the screen provides a holder for the tea leaves or ground coffee to be steeped or boiled, which is entirely open at its top so that the material carried on the screen will be free to rise in and be distributed throughout the boiling water when the latter is poured into the top portion of the pot, and the screen is provided with a suitable handle $b^2$ by which it may be inserted and removed. The spout is intended to be sealed during the steeping or boiling stage of the operation and this may be accomplished suitably by providing a removable plug or stopper $a^2$ for the spout.

In the use of my invention the screen is loaded with the desired amount of tea leaves or ground coffee and makes a substantially air tight joint with the pot, the spout is sealed and boiling water is poured into the pot upon the material on the screen, usually in sufficient quantity to fill the pot from the screen to its top. The seal of the spout prevents the air in the lower portion from escaping and holds the water in the upper portion of the pot where it acts to steep or boil the tea or coffee and when this process is completed the seal of the spout is broken, as by removing the plug or stopper $a^2$, when the liquid tea or coffee will run through the screen into the lower portion of the pot, and the screen with the spent coffee grounds or tea leaves is then withdrawn from the pot which is then filled with water so that coffee or tea to the full capacity of the pot is provided.

I am aware that it is not new to provide separate upper and lower pots adapted to fit together in removable relation with a screen between them, and I make no claim to such arrangement of parts, but by my invention I am able with a single pot to make the same amount of tea or coffee which theretofore required the use of two pots, and I also provide a construction which is much cheaper and simpler than the prior organization and which may be more easily and readily handled and kept clean.

While my invention is primarily intended for making coffee and tea it may of course be used for other purposes where any material is to be similarly treated, and by my invention the steeping or boiling operation is carried out without placing the pot on the stove or other heater.

I claim:

A device of the class described comprising a pot having its inner diameter reduced at or near the central portion of its area and a spout adapted to be sealed communicating with the pot below its reduced diameter, and a removable open-top screen having a body whose outer diameter is approximately equal to the inner diameter of the reduced portion of the pot to make a substantially air tight joint between the screen and inner wall of the pot above the spout-outlet and a handle on its upper side.

In testimony whereof I affix my signature in presence of two witnesses.

HUBERT GALT.

Witnesses:
J. McRoberts,
Edith Wilcox.

---

Copies of this patent may be obtained for five cents each, by addressing the "Commissioner of Patents, Washington, D. C."